May 16, 1939.   C. G. OLSON   2,158,378
LOCK WASHER
Filed March 20, 1937
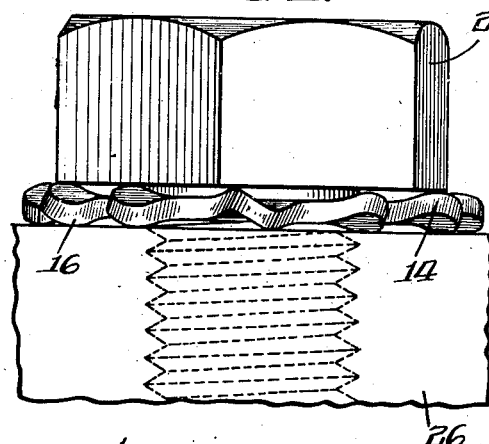
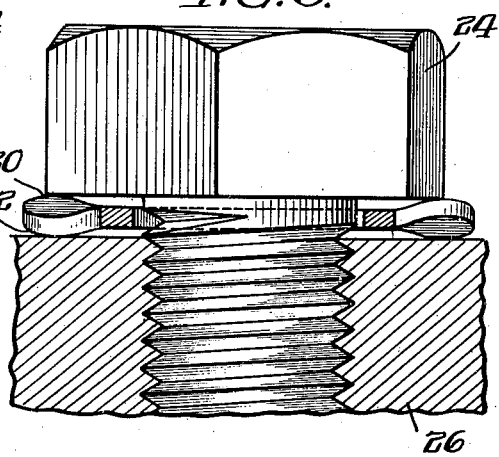
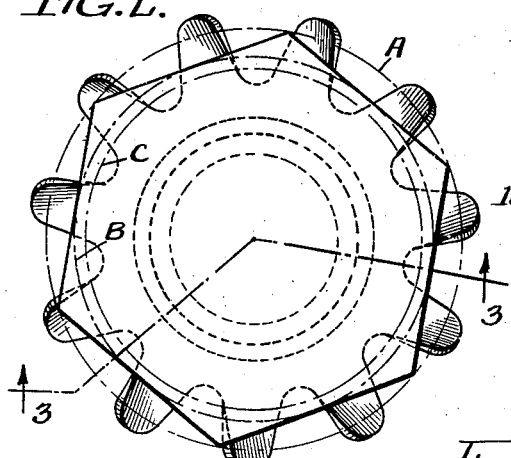
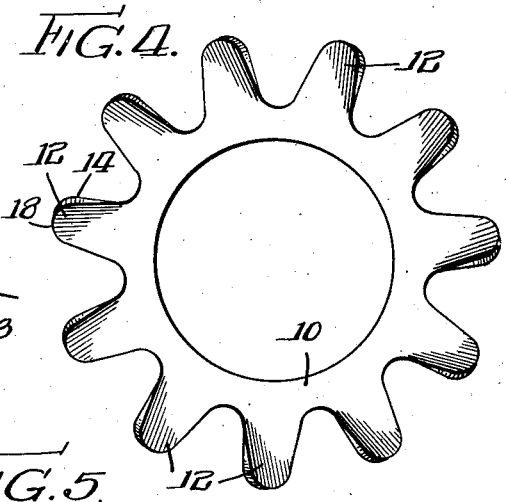
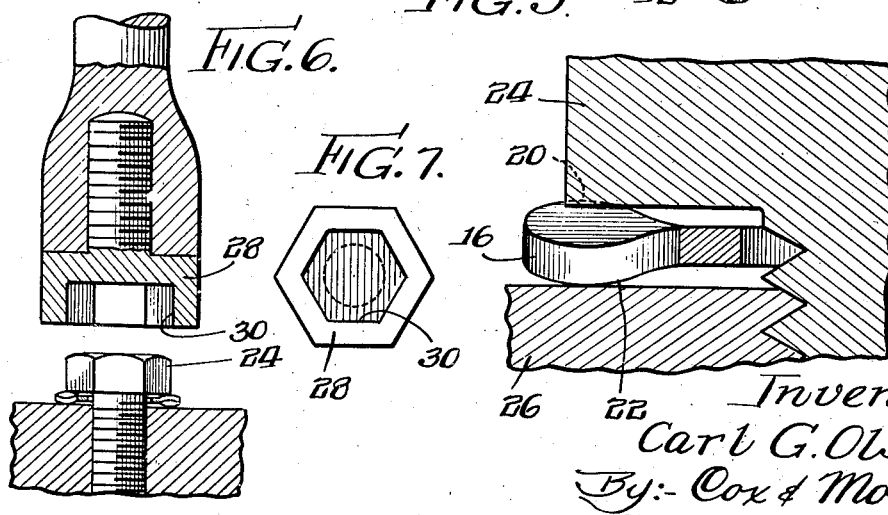
Inventor
Carl G. Olson
By:- Cox & Moore attys Patented May 16, 1939

2,158,378

UNITED STATES PATENT OFFICE 2,158,378

LOCK WASHER

Carl G. Olson, Chicago, Ill., assignor to Illinois Tool Works, Chicago, Ill., a corporation of Illinois Application March 20, 1937, Serial No. 132,053

5 Claims. (Cl. 151—35)

This invention relates generally to lock washers and more particularly to the type of lock washer provided with radial prongs along one margin of an annular body.

One of the primary objects of my invention is to provide a locking device of improved, practical construction which may be readily formed from flat spring stock.

More specifically my invention seeks to provide a lock washer with warped prongs which are of such shape and of such number relative to the number of sides of the clamping member as to improve the locking characteristics of the washer.

Present known lock washers of the external twisted-tooth type are commonly made in such sizes that the outside diameters correspond with the major diameters of the clamping surface of the nuts, or the head of the bolts, with which the washers are intended to be employed; that is to say, the outside diameters of the washers are made to agree with the diameters of the imaginary circles circumscribing the nuts. The teeth or prongs of lock washers now in common use present sharp projecting corners which have a tendency to catch extraneous objects, such as lint and cloth, and also have a tendency to mill or groove the work engaging and clamping surfaces. Furthermore, since the teeth of the washers project beyond the sides of the nut, being of greater diameter than the minor diameter of the nut, i. e., the diameter of the inscribed circle, the above tendencies are increased and the washer teeth also cut into the surface of a socket wrench used to manipulate the nut or bolt, thereby forming burrs which, in mass production work, become sufficiently dangerous to cause the discarding of the socket wrench.

Accordingly it is an object of applicant's invention to provide a lock washer which shall be free from the above stated defects and at the same time possess greater locking efficiency than known washers of the external twisted-tooth type.

According to the present invention the external teeth are so formed as to have at their outer edges substantially semicircular portions which, when the teeth are twisted, present to the work engaging and clamping surfaces curved clamping edges efficiently engaging said surfaces to lock the clamping element and work piece together and eliminating the disadvantages of the sharp-cornered teeth of the former external-tooth washers.

The present lock washers of the external, twisted-tooth type must be carefully dimensioned relative to the clamping nut with which they are to be used, for a slight change in the size of either causes a marked decrease in, or an entire loss of, the clamping effect of the lock washer.

It is therefore another object of the invention to provide a lock washer of the external twisted-tooth type which is capable of use with clamping nuts or bolts having heads of sizes varying within a substantial range.

Other objects and advantages will be apparent from the following detailed description when considered in connection with the accompanying drawing, wherein:

Fig. 1 is an elevation showing my improved washer as applied between a working nut and a work piece.

Fig. 2 is a plan view of my improved washer showing the same beneath a clamping member.

Fig. 3 is a vertical section taken along the line 3—3 of Fig. 2, the clamping member being shown in elevation.

Fig. 4 is a plan view of the improved lock washer.

Fig. 5 is an enlarged fragmentary vertical section similar to Fig. 3.

Fig. 6 is a vertical section showing a tool for manipulating the clamping element.

Fig. 7 is a plan view of the operating end of the tool of Fig. 6.

Referring to the drawing more in detail, wherein like numerals have been employed to designate similar parts throughout the various figures, it will be seen that my invention contemplates a locking device or washer which includes an annular body 10 and a plurality of radial prongs 12 formed and spaced along the outer margin thereof. Each of the prongs 12, prior to twisting, is shaped in such manner as to provide outwardly converging sides 14 and 16 and a substantially semicircular end portion 18.

Each of the prongs 12 of the completed washer is warped or twisted out of the plane of the washer body in such manner as to present convex work engaging edges 20 and 22 extending oppositely beyond the plane of the washer body and merging at one end into the flat annular body 10 and at the other end into the curved end portion 18. It will be observed from Figs. 1, 2, 3 and 5 that the teeth of the washer are free from sharp corners but provide work engaging edges of substantial length which extend beyond the corners of the clamping nut 24. In the form shown in the drawing the clamping nut is of the usual hexagonal configuration having a major diameter equal to the diameter of the circumscribed circle A and a minor diameter equal to the diameter of the inscribed circle B. The teeth 12 of the lock washer are so dimensioned as to extend a substantial distance outwardly of the circumscribed circle A and inwardly of the inscribed circle B and are equal in number to 7 or any greater number having no common denominator with 6. In other words, it may be stated in another way, that the number of teeth 12 may be equal to any integer relatively prime to the number of sides of the polygonal clamping member.

In tightening a nut against the lock washer where the teeth are of the same number as the number of sides of the nut, or equal to a multiple of the number of sides of the nut, the teeth all function alike by engaging the nut at like positions and with equal force to form impressions of uniform depth, the washer teeth uniformly resisting the tightening as well as the loosening of the nut. If, however, the outside diameter of the washer be greater than the diameter of the inscribed circle B of the nut and the number of teeth conforms to the above formula, to wit, 7 teeth and 6 sides, some of the teeth will engage the nut surface deeper than other teeth, the pressure or torque required being no greater than that required to engage all of the teeth uniformly. It has been found that this graded or unequal locking engagement of the teeth increases the locking power of the washer.

It will be seen from Fig. 2 that the nut engages the teeth at points of different radii and therefore the locking engagement of the several teeth with the nut or bolt is unequal. Since the locus of the points of maximum deformation of the teeth from the plane of the washer is substantially the circumscribed circle A of the nut and the locus of the points of minimum deformation is the circle C of diameter less than the diameter of the inscribed circle B, it will be seen that the teeth provide an annular locking zone wherein the locking effect of each tooth varies with the radius to the point of engagement between the tooth and nut. Since the number of teeth is not a multiple of the number of sides of the nut and has no common denominator with the number of said sides, the points of engagement of the teeth with the nut will vary between the circle C and the circumscribed circle A. Although, as stated above, the locus of the points of maximum deformation of the teeth is substantially the circumscribed circle of the clamping nut, other nuts which vary in size throughout a substantial range may be employed with applicant's improved washer without substantial loss of locking power. For example, if a nut having a greater dimension between the corners is used the points of maximum possible locking engagement will lie within the corners of the nut but the zone of locking engagement will be increased, thereby increasing the aggregate effective locking torque of the teeth engaging the nut between the corners. The result is a surprisingly uniform locking effect which is practically independent of the size of the nut within a substantial range of larger sizes.

If the nut employed is smaller in size than the preferred size, some loss in locking effect will be experienced though to no such degree as in the case of conventional lock washers because the improved lock washer offers what may be referred to as the graded zone of locking engagement which in the case of smaller sized nuts still offers a substantial locking effect. In the case of certain known lock washers of the twister-tooth type, the use of a nut of smaller size than the preferred size for which the washer is designed would substantially destroy the locking effect.

When a washer having an external diameter greater than the maximum dimension of the nut is employed, as shown in Fig. 2, the teeth contact the work piece 26 along the locus of the points of maximum deformation of the teeth from the plane of the washer body but the nut, as previously stated, engages the teeth between that locus and the locus of the points of minimum deformation. Consequently there is a tendency for the washer to dish slightly toward the work and thus increase the resilient clamping action of the washer, preventing retrograde movement of the nut or bolt. In other words, the dished washer renders the annular body resiliently cooperative with the prongs in resisting forces tending to loosen the nut.

In Figs. 6 and 7 of the drawing is shown a screw driver, the handle of which is threaded to receive an hexagonal bolt or screw 28 having an hexagonal socket 30 for receiving and operating the hexagonal clamping nut or bolt 24.

It will be seen from the above description that applicant has provided an especially efficient, improved lock washer with warped prongs which are of such shape and of such number relative to the number of sides of the ordinary clamping member as to improve the locking characteristics of the washer.

It is to be understood that throughout this description and claims, the word "nut" refers to all clamping members of polygonal configuration and includes the clamping heads of ordinary bolts.

While I have herein disclosed a washer of the external tooth type, wherein the teeth are twisted out of the plane of the washer body, it is to be understood that the invention is applicable to all types of lock washers wherein the teeth are warped out of the plane of the washer body.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. The combination of a work piece and a polygonal clamping member, a pronged washer interposed between the work piece and the clamping member, the ends of the teeth extending radially beyond the edge of the clamping member, the number of the teeth of the washer being greater by one than the number of sides of the polygonal clamping member.

2. The combination of a work piece and a polygonal clamping member, a pronged washer interposed between the work piece and the clamping member, the ends of the teeth extending radially beyond the edge of the clamping member and being of curved configuration, the number of the teeth of the washer being greater by one than the number of sides of the polygonal clamping member.

3. The combination of a work piece and polygonal clamping member, a washer having a plurality of teeth interposed between the work piece and the clamping member, the ends of the teeth extending radially beyond the clamping member, the number of teeth being an integer relatively prime to the number of sides of the polygonal clamping member.

4. The combination of a work piece and polygonal clamping member, a twisted-tooth washer interposed between the work piece and the clamping member, the ends of the twisted teeth extending radially beyond the clamping member and being of curved configuration, the number of teeth being an integer relatively prime to the number of sides of the polygonal clamping member.

5. In a locking device for use with a workpiece and polygonal clamping member, comprising a washer having a plurality of teeth interposed between the workpiece and the clamping member, the teeth extending from the body of the washer and being provided with convex, rounded extremities, the number of teeth being an integer relatively prime to the number of sides of the polygonal clamping member.

CARL G. OLSON.